(12) United States Patent
Otani

(10) Patent No.: US 9,627,133 B2
(45) Date of Patent: *Apr. 18, 2017

(54) LAMINATED CERAMIC ELECTRONIC COMPONENT

(71) Applicant: Murata Manufacturing Co., Ltd., Nagaokakyo-shi, Kyoto-fu (JP)

(72) Inventor: Shinji Otani, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 5 days.

This patent is subject to a terminal disclaimer.

(21) Appl. No.: 14/739,301

(22) Filed: Jun. 15, 2015

(65) Prior Publication Data

US 2015/0279566 A1  Oct. 1, 2015

Related U.S. Application Data

(63) Continuation of application No. PCT/JP2013/081569, filed on Nov. 23, 2013.

(30) Foreign Application Priority Data

Dec. 18, 2012  (JP) .................. 2012-275526

(51) Int. Cl.
*H01G 4/30* (2006.01)
*H01G 4/008* (2006.01)
(Continued)

(52) U.S. Cl.
CPC ............ *H01G 4/008* (2013.01); *H01G 4/012* (2013.01); *H01G 4/232* (2013.01);
(Continued)

(58) Field of Classification Search
CPC   H01G 4/30; H01G 4/005; H01G 4/06; H01G 4/228
See application file for complete search history.

(56) References Cited

U.S. PATENT DOCUMENTS 8,168,889 B2   5/2012 Ikarashi et al.
2006/0044098 A1   3/2006 Kimura et al.
(Continued)

FOREIGN PATENT DOCUMENTS

CN   101341557 A   1/2009
JP   H10-279903 A   10/1988
(Continued)

OTHER PUBLICATIONS

International Search Report issued for PCT/JP2013/081569, date of mailing Jan. 14, 2014.
(Continued)

*Primary Examiner* — Nguyen Ha
(74) *Attorney, Agent, or Firm* — Arent Fox LLP

(57) ABSTRACT

A laminated ceramic electronic component that includes a laminated body formed by laminating a ceramic layer and an internal electrode, and forming an external electrode on an outer surface of the laminated body so as to be electrically connected to the internal electrode. The external electrode includes a conducting layer that is in contact with the internal electrode, and the internal electrode contains Ni. The conducting layer contains metal particles containing a $Cu_3Sn$ alloy, and a thermosetting resin. The internal electrode and the conducting layer are bonded to each other with a CuSnNi alloy phase interposed therebetween.

10 Claims, 3 Drawing Sheets

(51) Int. Cl.
*H01G 4/232* (2006.01)
*H01G 4/012* (2006.01)
*H01G 4/248* (2006.01)
*H01G 4/12* (2006.01)

(52) U.S. Cl.
CPC .......... *H01G 4/2325* (2013.01); *H01G 4/248* (2013.01); *H01G 4/30* (2013.01); *H01G 4/12* (2013.01)

(56) References Cited

U.S. PATENT DOCUMENTS

| | | |
|---|---|---|
| 2009/0139754 A1 | 6/2009 | Ikarashi et al. |
| 2009/0155608 A1 | 6/2009 | Nomura et al. |
| 2013/0342958 A1 | 12/2013 | Suzuki et al. |
| 2015/0279563 A1* | 10/2015 | Otani ................ H01G 4/30 361/301.4 |
| 2015/0279566 A1 | 10/2015 | Otani |

FOREIGN PATENT DOCUMENTS

| | | |
|---|---|---|
| JP | H0394409 A | 4/1991 |
| JP | H11-307930 A | 11/1999 |
| JP | 2001244367 A | 9/2001 |
| JP | 2001244467 A | 9/2001 |
| JP | 2002198654 A | 7/2002 |
| WO | WO 2004/053901 A1 | 6/2004 |
| WO | WO 2007/072894 A1 | 6/2007 |

OTHER PUBLICATIONS

Written Opinion of the International Searching Authority issued for PCT/JP2013/081569, date of mailing Jan. 14, 2014.

* cited by examiner

LAMINATED CERAMIC ELECTRONIC COMPONENT

CROSS REFERENCE TO RELATED APPLICATIONS

The present application is a continuation of International application No. PCT/JP2013/081569, filed Nov. 23, 2013, which claims priority to Japanese Patent Application No. 2012-275526, filed Dec. 18, 2012, the entire contents of each of which are incorporated herein by reference.

FIELD OF THE INVENTION

The present invention relates to a laminated ceramic electronic component, and particularly to a configuration of an external electrode.

BACKGROUND OF THE INVENTION

Techniques interesting to the present invention are described in, for example, International Publication No. WO 2004/053901 (Patent Document 1).

Patent Document 1 describes, in claim 1 thereof, a laminated ceramic electronic component including an external electrode formed of a thermosetting conductive paste that contains a metal powder (metal A) having a melting point of 300° C. or lower, high-melting-point conductive particles (metal B), and a resin. It is provided in claim 2 of Patent Document 2 that the total amount of A and B in the paste is 70 to 95% by weight based on the total amount of A, B and the resin. It is provided in claim 3 of Patent Document 2 that the blending ratio of A:B is 5:95 to 20:80 in terms of a weight ratio. It is provided in claim 4 of Patent Document 2 that the paste is held at 80 to 400° C. for 1 to 60 minutes for obtaining an external electrode. It is provided in claim 5 of Patent Document 2 that the conductive particles in the external electrode and the metal of the internal electrode are diffusion-bonded to each other.

In regard to the blending ratio of the low-melting-point metal (A), it is provided in claim 3 of Patent Document 1 that the blending ratio of the low-melting-point metal (A) is 5 to 20% by weight. However, as a result of experiments conducted by the present inventors, it has become apparent that when the conductive adhesive described in Patent Document 1 is used for forming an external electrode in a laminated ceramic electronic component that includes an internal electrode containing Ni, the external electrode has poor bondability to the internal electrode because the ratio of the low-melting-point metal (A) is as low as 5 to 20% by weight. If a heat treatment is performed at a temperature above the range of 80 to 400° C. as specified in claim 4, for example 500° C. or higher, the external electrode can be satisfactorily bonded to the internal electrode, but metal balls are deposited (or erupted) from the external electrode, and therefore a plating failure occurs in a plating step such as Ni plating which is subsequently carried out.

Patent Document 1: International Publication No. WO 2004/053901

SUMMARY OF THE INVENTION

Thus, an object of the present invention is to solve the above-mentioned problem to provide a laminated ceramic electronic component of which electrical stability can be ensured by securing satisfactory bondability of an external electrode to an internal electrode.

The present invention is directed to a laminated ceramic electronic component including: a laminated body formed by laminating a ceramic layer and an internal electrode; and an external electrode formed on an outer surface of the laminated body so as to be electrically connected to the internal electrode, the external electrode including a conducting layer that is in contact with the internal electrode, the internal electrode containing Ni, wherein for solving the above-described technical problem, the internal electrode and the conducting layer are bonded to each other with a CuSnNi alloy phase interposed therebetween.

Preferably, the solid solution amount of Ni in the CuSnNi alloy phase is 5 atm % to 42 atm %.

According to the present invention, a conducting layer provided in an external electrode is in contact with an internal electrode with a CuSnNi alloy phase interposed therebetween, and thus strong physical bonding is achieved between the external electrode and the internal electrode, so that the stability of electrical characteristics of a laminated ceramic electronic component can be ensured.

The CuSnNi alloy phase generated in the present invention can be generated at a lower temperature in a shorter time as compared to $Ni_3Sn_2$ generated when an AgSn-based metal is used in place of the $Cu_3Sn$ alloy in the present invention.

When the solid solution amount of Ni in the CuSnNi alloy phase is selected to be in a range of 5 to 42 atm % in the present invention, excessive diffusion of Ni between the internal electrode and the conducting layer can be suppressed, so that strong bonding can be more reliably achieved between the external electrode and the internal electrode.

DETAILED DESCRIPTION OF THE INVENTION

An embodiment of the present invention will be described below in relation to a laminated ceramic capacitor.

Figure 1:
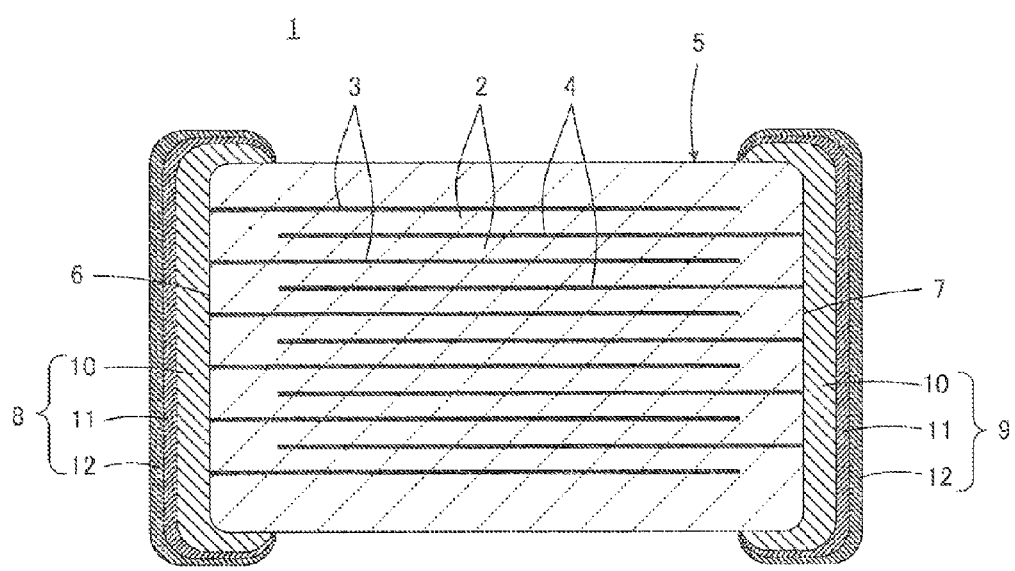
FIG. 1 is a sectional view showing a laminated ceramic capacitor 1 according to one embodiment of the present invention.

Referring to FIG. 1, a laminated ceramic capacitor 1 includes a laminated body 5 formed by laminating a plurality of ceramic layers 2 composed of a dielectric ceramic, and a plurality of first internal electrodes 3 and second internal electrodes 4. In the laminated body 5, the first internal electrodes 3 and the second internal electrodes 4 are alternately arranged when viewed in a lamination direction, and the first internal electrode 3 and the second internal electrode 4 face each other with the ceramic layer 2 held therebetween. The first internal electrode 3 is extended to a first end surface 6 of the laminated body 5, and the second internal electrode 4 is extended to a second end surface 7 of the laminated body 5 which faces the first end surface 6. The internal electrodes 3 and 4 contain Ni as a conductive component.

The laminated ceramic capacitor 1 also includes first and second external electrodes 8 and 9 formed on the outer surface of the laminated body 5. The first external electrode 8 is formed so as to cover the first end surface 6 of the laminated body 5, and electrically connected to the first internal electrodes 3. The second external electrode 9 is formed so as to cover the second end surface 7 of the laminated body 5, and electrically connected to the second internal electrodes 4.

The external electrodes 8 and 9 each include a conducting layer 10 that is in contact with the outer surface of the laminated body 5. Accordingly, the conducting layers 10 of the first and second external electrodes 8 and 9 are in contact with the first and second internal electrodes 3 and 4, respectively. A composition of the conducting layer 10 and a method for formation thereof will be described in detail later.

In the illustrated embodiment, the conducting layer 10 containing a resin has one-layer structure, but a further conducting layer containing a resin may be formed on the conducting layer 10.

In the illustrated embodiment, the external electrodes 8 and 9 each further include a Ni plating layer 11 formed on the conducting layer 10, and a Sn plating layer 12 formed on the Ni plating layer 11.

Ni and Sn that form the plating layers 11 and 12, respectively, may be replaced by other metals such as Cu and Au as necessary. One of the plating layers 11 and 12 may be omitted. Further, the external electrodes 8 and 9 may be provided with none of the plating layers 11 and 12, and composed only of the conducting layer 10.

A method for forming the external electrodes 8 and 9, particularly a method for forming the conducting layer 10 will now be described.

For forming the conducting layer 10, a thermosetting conductive resin composition containing a Cu powder, a Sn powder, a thermosetting resin and an organic solvent is provided. In the thermosetting conductive resin composition, the content of the Sn powder based on the total amount of the Cu powder and the Sn powder is preferably 36.5 to 47.8% by weight. Preferably, a thermosetting resin to be contained in the thermosetting conductive resin composition is selected so that the residual stress after curing is 8 MPa or more.

The thermosetting resin to be used is not particularly limited as long as the residual stress after curing is 8 MPa or more, and when an epoxy resin is used as a base resin, for example, an alkali resol-type phenolic resin, a novolac-type phenolic resin, a nitrogen compound such as dihydrazide, dicyandiamide, an aliphatic or aromatic amine, a tertiary amine or imidazole, an acid anhydride, other organic acids or salt thereof, or a combination thereof may be used as a curing agent.

As the epoxy resin as a base resin, a bisphenol A-type epoxy resin, a bisphenol F-type epoxy resin, a phenol novolac-type epoxy resin, a cresol novolac-type epoxy resin, an aromatic glycidylamine-type epoxy resin, a dimer acid-modified epoxy resin, a urethane-modified epoxy resin, a silicon-modified epoxy resin, a chelate-modified epoxy resin, a cycloaliphatic epoxy resin, or a combination thereof may be used.

Not only a combination of an epoxy resin and a curing agent, but also a combination of an isocyanate compound and a polyol as a thermosetting resin, or a self-polymerizable alkali resol-type phenolic resin alone may be used.

The thermosetting conductive resin composition is added to the end surfaces 6 and 7 of the laminated body 5 obtained by passing through a firing step. More specifically, for example, a pasty uncured thermosetting conductive resin composition is spread to a predetermined thickness with a squeegee, and the end surfaces 6 and 7 of the laminated body 5 are each immersed therein to add the uncured thermosetting conductive resin composition to the end surfaces 6 and 7 of the laminated body 5.

The added thermosetting conductive resin composition is then dried to remove an organic solvent.

Figure 2:
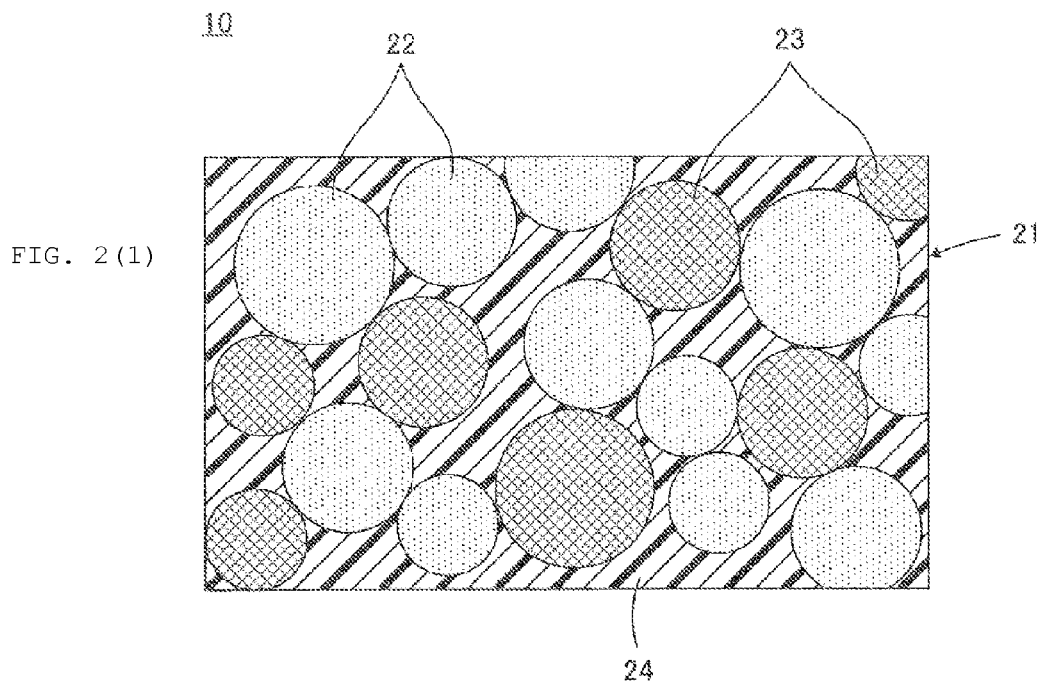
FIGS. 2(1) and 2(2) are partial enlarged sectional views of a conducting layer 10, each of which schematically shows a process of forming the conducting layer 10 in external electrodes 8 and 9 of the laminated ceramic capacitor 1 shown in FIG. 1, where FIG. 2(1) shows a state before heat treatment, and FIG. 2(2) shows a state after heat treatment.
Figure 2:
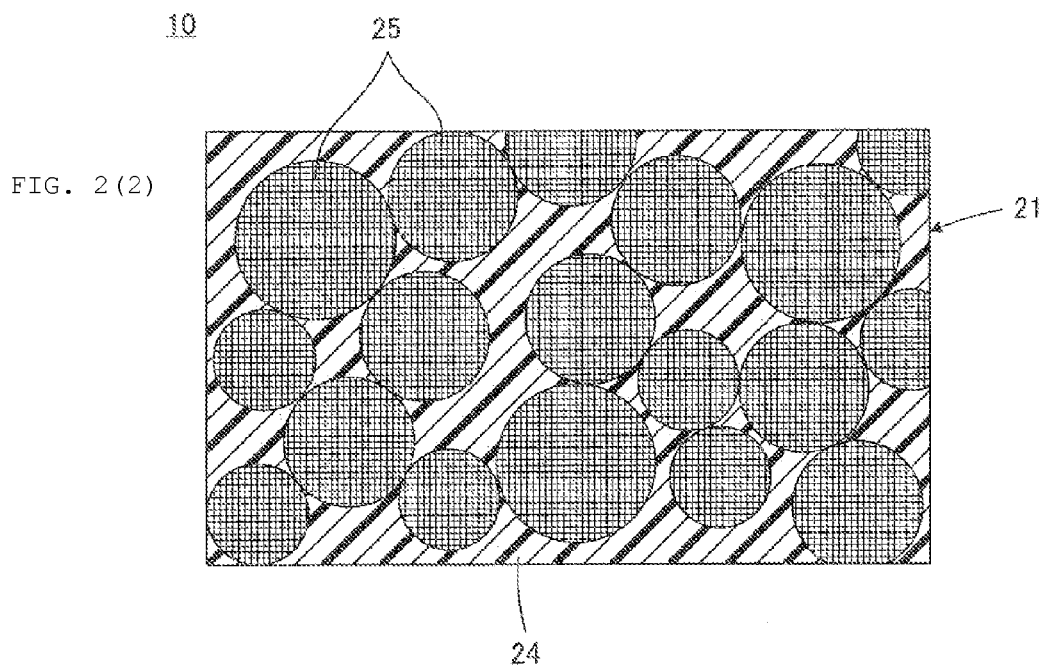

FIG. 2(1) schematically shows a cross-sectional structure of the thermosetting conductive resin composition 21 in a state after drying, which is to form the conducting layer 10. As shown in FIG. 2(1), the thermosetting conductive resin composition 21 is in a state in which a Cu powder 22 and a Sn powder 23 are dispersed in a thermosetting resin 24. The Cu powder 22 and the Sn powder 23 are at least partially in contact with each other.

Here, the total content of the Cu powder 22 and the Sn powder 23 in the thermosetting conductive resin composition 21 after drying is preferably 45 to 65% by volume. Preferably, the D50 value of the Cu powder 22 contained in the thermosetting conductive resin composition before curing is 0.5 to 3.0 µm, and the D50 value of the Sn powder 23 contained in the thermosetting resin composition before curing is 1.5 to 5.0 µm.

Next, a step of heat-treating the thermosetting conductive resin composition 21 is carried out. In this heat treatment step, the thermosetting resin 24 is cured, and mutual diffusion progresses between the Cu powder 22 and the Sn powder 23. Normally, the thermosetting resin 24 is first cured, and due to shrinkage on curing, the distance between the Cu powder 22 and the Sn powder 23 is reduced to increase contacts between the Cu powder 22 and the Sn powder 23. Mutual diffusion continuously progresses between the Cu powder 22 and the Sn powder 23. As a result, a plurality of metal particles 25 containing a $Cu_3Sn$ alloy are generated as shown in FIG. 2(2).

When as described above, the thermosetting conductive resin composition 21 is in the state shown in FIG. 2(1), and the content of the Sn powder 23 based on the total amount of the Cu powder 22 and the Sn powder 23 is 36.5 to 47.8% by weight, a metal component contained in the metal particles 25 shown in FIG. 2(2) contains Cu and Sn, and the weight ratio of Sn to the total amount of Sn and Cu is 36.5 to 47.8%.

Although not illustrated in FIG. 2(2), not only a $Cu_3Sn$ alloy but also a $Cu_6Sn_5$ alloy, a Cu metal and/or a Sn metal may remain in the metal particles 25 depending on a state of progress of mutual diffusion, and as a result of mutual diffusion, voids may be left at some of portions where the Cu powder 22 or the Sn powder 23 has existed in the thermosetting resin 24.

Here, the abundance ratio of the $Cu_3Sn$ alloy is preferably as close as possible to 100% by weight because a CuSnNi alloy phase as described later is easily generated, but there is practically no problem as long as the abundance ratio of the $Cu_3Sn$ alloy is 25% by weight or more.

The cured conducting layer 10 is formed in the manner described above, and in this formation step, deposition (or eruption) of metal balls can be suppressed. This may be because $Cu_3Sn$ has a melting point of about 676° C., and thus is not remelted in a heat treatment process.

Figure 3:
FIG. 3 is a view showing a SEM picture that is taken of a CuSnNi alloy phase formed at a part where an internal electrode and a conducting layer are in contact with each other.

A CuSnNi alloy phase is formed at a part that is in contact with each of the internal electrodes 3 and 4 and the conducting layer 10 in the heat treatment step. FIG. 3 shows a "CuSnNi alloy phase" observed from a SEM picture. As shown in FIG. 3, a "CuSnNi alloy phase" is formed at a part that is in contact with the "internal electrode" containing Ni, and the conducting layer (a part where the "$Cu_3Sn$ alloy" and the "thermosetting resin" exist). The CuSnNi alloy phase has the alloy composition of $(Cu,Ni)_6Sn_5$, and the composition varies depending on a solid solution amount of Ni. The solid solution amount of Ni in the alloy phase is preferably 5 to 42 atm %. The CuSnNi alloy phase contributes to improvement of bondability of the external electrodes 8 and 9 to the internal electrodes 3 and 4. The $Cu_3Sn$ as an intermetallic compound that can be generated in the conducting layer 10 may be metal-bonded to the internal electrodes 3 and 4 containing Ni, resulting in formation of a CuSnNi alloy phase.

The present invention has been described above in relation to a laminated ceramic capacitor, but the present invention can also be applied to a laminated ceramic electronic component other than a laminated ceramic capacitor.

Examples of experiments carried out for determining a range and a more preferred range in the present invention will now be described. It should be understood that those that fall within the range in the present invention, but fall out of the more preferred range in the present invention have practically no problem, and can solve the problems to be solved by the present invention.

EXPERIMENTAL EXAMPLE 1

Experimental Example of Changing Ratio of Sn (1) Preparation of Thermosetting Conductive Resin Composition A Cu powder composed of spherical particles with a D50 value of 1.0 μm, a Sn powder composed of spherical particles with a D50 value of 2.5 μm, a resol-type phenolic resin A as a thermosetting resin and diethylene glycol monobutyl ether as an organic solvent were mixed by a small mixer, and then kneaded by metallic three rolls. Thereafter, the amount of diethylene glycol monobutyl ether as an organic solvent was adjusted while a viscosity was measured using an E-type viscometer, so that an uncured thermosetting conductive resin composition with the viscosity adjusted to 1 rpm/30±2 Pa·s was obtained as a sample.

While the total content of the Cu powder and the Sn powder in the thermosetting conductive resin composition was 55% by volume after removal of the organic solvent, the ratio of Sn powder to the total amount of the Sn powder and the Cu powder was changed as shown in the column "ratio of Sn" in Table 1.

The D50 value described above is a volume-based value measured by a laser diffraction method.

(2) Formation of Conducting Layer

A laminated body was provided as a component main body for a laminated ceramic capacitor which was provided with an internal electrode mainly composed of Ni and which had a plane dimension of 1.0 mm×0.5 mm and an electrostatic capacity of 1 μF.

On the other hand, the uncured thermosetting conductive resin composition prepared as described above was spread to a thickness of 150 μm with a squeegee, and one end surface of the laminated body was immersed therein to apply the thermosetting conductive resin composition to the end surface. Thereafter, the thermosetting conductive resin composition was dried at 150° C. for 10 minutes using a hot air circulating oven. A similar step was carried out for the other end surface of the laminated body. In this manner, a laminated body with a thermosetting conductive resin composition added to each of both end surfaces was obtained.

Next, the laminated body was subjected to a heat treatment under the condition of raising the temperature at a temperature rise rate of 15° C./minute in a nitrogen atmosphere with a measured oxygen concentration of less than 10 ppm, and keeping a top temperature at 450° C. for 20 minutes, so that the thermosetting conductive resin composition was cured. In this way, a laminated body in which a conducting layer in an external electrode was formed on each of both end surfaces was obtained.

(3) Formation of Plating Layer

Next, using a wet electrolytic barrel method, a Ni plating layer with a thickness of about 2.5±1.5 μm was formed on the conducting layer, and a Sn plating layer with a thickness of about 3.5±1.5 μm was then formed thereon. In this way, a laminated ceramic capacitor as a sample was obtained.

(4) Evaluations (4A) Residual Stress after Curing (Phosphor-Bronze Plate Method)

A phosphor-bronze plate having a plane dimension of 10 mm×60 mm and a thickness of 200 μm was provided, and the thermosetting conductive resin composition as a sample was applied onto the phosphor-bronze plate in a thickness of about 150 μm.

The thermosetting conductive resin composition on the phosphor-bronze plate was dried at 150° C. for 10 minutes using a hot air drying oven, and then subjected to a heat treatment under the condition of raising the temperature at a temperature rise rate of 15° C./minute in a nitrogen atmosphere with a measured oxygen concentration of less than 10 ppm, and keeping a top temperature at 450° C. for 20 minutes, so that the thermosetting conductive resin composition was cured.

Thereafter, a thickness of the cured resin film was measured by a micrometer, and a curvature amount h of the phosphor-bronze plate was measured by image analysis. Using a microhardness tester, a Young's modulus of each of the cured resin film and the phosphor-bronze plate was measured for five samples, and an average thereof was determined. A residual stress value after curing of the resin was determined from the Inoue-Kobatake equation below.

$$\text{Residual stress} P[GPa] = E2 \times h2/(12\rho) \times F(m,n)/(n(n+1))$$

wherein $$F(m,n) = ((1-mn^2)^3 \times (1+m) + (mn(n+2)+1)^3 + m(mn^2 + 2n+1)^3)/(1+mn)^3; \text{ curvature radius} \rho[mm] = (4x^2 + L^2)/8x;$$

$x = h/4$;

h [mm]: curvature amount of phosphor-bronze plate;

L [mm]: total length of phosphor-bronze plate;

E1 [GPa]: Young's modulus of resin;

E2 [GPa]: Young's modulus of phosphor-bronze plate;

$m = E1/E2$;

h1 [mm]: thickness of cured resin film;

h2 [mm]: thickness of phosphor-bronze plate; and $n = h1/h2$.

The results thereof are shown in the column of "residual stress after curing" in Table 1. In samples 1 to 7 shown in Table 1, the "residual stress after curing" was determined only for sample 4.

(4B) Observation of Outer Appearance of Conducting Layer

Five laminated bodies before plating in which a conducting layer in an external electrode was formed on each of both end surfaces were provided for each sample, and the central part of the conducting layer on one of the end surfaces of the laminated body was observed at a secondary electron image magnification of 1000 using a field emission scanning electron microscope (FE-SEM). In Table 1, a sample for which eruption of a metal ball with a diameter of 10 μm or more was found in even one of the five laminated bodies is marked as "NG" in the column of "metal ball", and a sample for which a metal ball with a diameter of 10 μm or more was found in none of the five laminated bodies is marked as "G" in the same column.

In Table 1, there is not a sample to be marked as "NG".

(4C) Evaluation of Bondability Between Internal Electrode and External Electrode (Conducting Layer)

From laminated ceramic capacitors as samples, five laminated ceramic capacitors were selected for each sample.

A laminated ceramic capacitor related to each sample was then embedded in a resin, and wet-polished up to a ½ position in the width direction (W/2 position), and an interface part between the internal electrode and the conducting layer was then photographed at a reflection electron image magnification of 1500 using a FE-SEM. In Table 1, a sample for which there was no CuSnNi alloy phase immediately above the internal electrode in even one of the five laminated ceramic capacitors is marked as "x" in the column of "bondability", and a sample for which there was a CuSnNi alloy phase in all the five laminated ceramic capacitors was marked as "o" in the same column.

(4D) Ni Ratio in CuSnNi Alloy Phase

For the samples evaluated in (4C), the CuSnNi alloy phase generated immediately above the internal electrode situated at the central position in the lamination direction was subjected to point analysis at an accelerating voltage of 10 kV by energy dispersive X-ray spectroscopy (EDX), a metal composition ratio of Cu, Sn and Ni was quantitatively determined to obtain a solid solution amount of Ni, and an average of solid solution amounts of Ni for five samples.

The results thereof are shown in the column of "Ni ratio in CuSnNi alloy phase" in Table 1.

The results thereof are shown in the column of "electrical characteristics" in Table 1.

"o" in this column shows that the electrostatic capacity fell within ±20% from 1.0 μF, i.e. in a range of 0.8 to 1.2 μF in all of the 20 samples, and the dielectric loss tangent was 7.5% or less in all of the 20 samples.

"x (cap/DF)" in this column shows that the electrostatic capacity fell out of the range of 0.8 to 1.2 μF in even one of the 20 samples, and the dielectric loss tangent was higher than 15% in even one of the 20 samples.

"Δ (DF)" in this column shows that the dielectric loss tangent was not higher than 15%, but was higher than 7.5% in even one of the samples.

In Table 1, there is not a sample to be marked as "Δ (DF)".

(4F) Quantitative Determination of Weight Ratio of Sn to Total Amount of Sn and Cu From laminated ceramic capacitors as samples, five laminated ceramic capacitors were selected for each sample.

A laminated ceramic capacitor related to each sample was then embedded in a resin, and wet-polished up to a ½ position in the width direction (W/2 position), the whole of an exposed cross section of a conducting layer was then analyzed at an accelerating voltage of 10 kV by energy dispersive X-ray spectroscopy (EDX) to determine an intensity ratio of Cu and Sn, a weight ratio of Sn to the total amount of Sn and Cu was quantitatively determined, and an average of the weight ratio of Sn for the samples was determined.

The obtained value was equal to the content of the Sn powder ("ratio of Sn" in Table 1) in the thermosetting conductive resin composition before it was thermally cured.

(4G) Ratio of $Cu_3Sn$ Alloy to Total Amount of Sn and Cu Contained in Conducting Layer From laminated ceramic capacitors as samples, three laminated ceramic capacitors were selected for each sample. A laminated ceramic capacitor related to each sample was then embedded in a resin, and wet-polished up to a ½ position in the width direction (W/2 position), the whole of an exposed cross section of a resin electrode layer was then analyzed by XRD to determine an intensity ratio of Cu, Sn, the $Cu_3Sn$ alloy and the $Cu_6Sn_5$ alloy that were contained in the resin electrode layer. An average of the ratio of the $Cu_3Sn$ alloy for the three samples was then determined. The obtained values are shown in the column of "ratio of $Cu_3Sn$ alloy" in Table 1.

TABLE 1

| Sample number | Ratio of Sn (% by weight) | Residual Stress after Curing (MPa) | Ratio of $Cu_3Sn$ alloy (% by weight) | Metal ball | Bondability | Ni Ratio in CuSnNi Alloy Phase (atom %) | Electrical characteristics |
|---|---|---|---|---|---|---|---|
| 1 | 35 | — | 61 | G | x | 0 | x(cap/DF) |
| 2 | 36.5 | — | 68 | G | o | 5 | o |
| 3 | 38 | — | 72 | G | o | 5 | o |
| 4 | 40 | 10 | 75 | G | o | 13 | o |
| 5 | 45 | — | 69 | G | o | 30 | o |
| 6 | 47.8 | — | 65 | G | o | 42 | o |
| 7 | 48 | — | 61 | G | o Excess | 44 | o |

(4E) Electrical characteristics

For each sample, 20 laminated ceramic capacitors were heat-treated at a temperature of 150° C. for 60 minutes, and then left standing at room temperature for 24 hours. Thereafter, an electrostatic capacity (cap) and a dielectric loss tangent (DF) were measured under the conditions of 1 MHz and 0.5 Vrms using a LCR meter.

In Table 1 and subsequent Tables 3, 7 and 9, "-" in columns showing the evaluation results shows that evaluation was not performed.

(5) Discussions

In samples 2 to 7 in which the "ratio of Ni in CuSnNi alloy phase" was not 0 atm %, i.e. a CuSnNi alloy phase was formed, satisfactory results were obtained in the evaluation items of "metal ball", "bondability" and "electrical characteristics".

On the other hand, sample 1 in which the "ratio of Ni in CuSnNi alloy phase" was 0 atm %, i.e. a CuSnNi alloy phase was not formed was rated "x" for "bondability", and rated "x (cap/DF)" for "electrical characteristics". This may be because the "ratio of Sn" was as low as 35% by weight, leading to a shortage of Sn involved in bonding to the internal electrode.

In sample 7 in which the "ratio of Sn" was 48% by weight and the "ratio of Ni in CuSnNi alloy phase" was 44 atm %, the rate of "o" was given for "bondability", but excessive diffusion occurred between the internal electrode and the conducting layer, and thus electrical characteristics after the thermal shock test were deteriorated although not shown in Table 1. This may be because the "ratio of Ni in CuSnNi alloy phase" was 44 atm %, an excessively high value, so that the bonded part was embrittled.

From the above, it is apparent that the "ratio of Ni in CuSnNi alloy phase" is preferably 5 to 42 atm % as in samples 2 to 6.

The "residual stress after curing" determined for sample 4 was 10 MPa. Accordingly, it can be thought that for samples 1 to 3 and 5 to 7 different from sample 4 only in "ratio of Sn", the same "residual stress after curing" is obtained.

EXPERIMENTAL EXAMPLE 2

Experimental Example of Changing Ratio of Cu$_3$Sn by Changing Conditions During Curing (1) Preparation of Thermosetting Conductive Resin Composition A thermosetting conductive resin composition having a composition similar to sample 4 in Example 1.

(2) Formation of Conducting Layer

Except that the top temperature and the keeping time during curing were changed as shown in the columns of "top temperature" and "keeping temperature", respectively, in "curing" in Table 2, the same procedure as in Experimental Example 1 was carried out to obtain a laminated body in which a conducting layer in an external electrode was formed on each of both end surfaces.

The top temperature and the keeping time for obtaining sample 4-2 in Experimental Example 2 are identical, respectively, to the top temperature and the keeping time for obtaining sample 4 in Experimental Example 1.

(3) Formation of Plating Layer

A laminated ceramic capacitor as a sample was obtained by forming a Ni plating layer and a Sn plating layer on a conducting layer under the same conditions as in Experimental Example 1.

(4) Evaluations

As shown in Table 2, each sample was evaluated for the items of "metal ball", "bondability", "ratio of Cu$_3$Sn alloy", and "electrical characteristics" in the same manner as in Experimental Example 1.

TABLE 2

| Sample number | Ratio of Sn (% by weight) | Curing | | Ratio of Cu$_3$Sn alloy (% by weight) | Metal ball | Bondability | Electrical characteristics |
| | | Top temperature (° C.) | Keeping time (minutes) | | | | |
| --- | --- | --- | --- | --- | --- | --- | --- |
| 4-1 | 40 | 550 | 20 | 98 | G | o | o |
| 4-2 | 40 | 450 | 20 | 75 | G | o | o |
| 4-3 | 40 | 450 | 5 | 65 | G | o | o |
| 4-4 | 40 | 400 | 5 | 25 | G | o | o |
| 4-5 | 40 | 350 | 5 | 16 | G | o(Sparse) | o |

(5) Discussions

When the top temperature during curing was lowered, mutual diffusion of the blended Cu powder and Sn powder was hard to be promoted, so that the ratio of Cu$_3$Sn alloy to the total amount of Sn and Cu contained in the conducting layer decreased.

When the ratio of Cu$_3$Sn alloy decreases, a CuSnNi alloy phase tends to be hardly formed between the internal electrode and the external electrode. Therefore, sample 4-5 having a ratio of Cu$_3$Sn alloy of 15% by weight was rated "o" for bondability, but the generation ratio of the Cu$_3$Sn alloy decreased, and resultantly the CuSnNi alloy phase was only sparsely formed in this sample.

From the above, it can be thought that when the ratio of Cu$_3$Sn alloy to the total amount of Sn and Cu contained in the conducting layer is 25% by weight or more as in samples 4-1 to 4-4, the CuSnNi alloy phase can be sufficiently formed.

EXPERIMENTAL EXAMPLE 3

Experimental Example of Changing Thermosetting Resin (1) Preparation of Thermosetting Conductive Resin Composition Except that the ratio of Sn powder to the total amount of the Sn powder and the Cu powder was fixed at 40% by weight and instead, as a thermosetting resin, one shown in the column of "type of thermosetting resin" in Table 3 was used, the same procedure as in Experimental Example 1 was carried out to obtain an uncured thermosetting conductive resin composition as a sample.

(2) Formation of Conducting Layer

Under the same conditions as in Experimental Example 1, a thermosetting conductive resin composition was added to each of both end surfaces of a laminated body as a component main body for a laminated ceramic capacitor, and heat-treated to obtain a laminated body in which a conducting layer in an external electrode was formed on each of both end surfaces.

(3) Formation of Plating Layer

A laminated ceramic capacitor as a sample was obtained by forming a Ni plating layer and a Sn plating layer on a conducting layer under the same conditions as in Experimental Example 1.

(4) Evaluations

As shown in Table 3, samples were evaluated for the items of "residual stress after curing", "metal ball", "bondability", and "electrical characteristics" as evaluated in Experimental Example 1.

TABLE 3

| Sample number | Type of thermosetting resin | Residual Stress after Curing (MPa) | Metal ball | Bondability | Electrical characteristics | Remarks |
|---|---|---|---|---|---|---|
| 11 | Resol-type phenolic resin B | 8 | G | ○ | ○ | |
| 12 | Resol-type phenolic resin C | 5 | G | ○ | Δ (DF) | DF Varied |
| 13 | Polyfunctional epoxy + novolac-type phenol D | 8 | G | ○ | ○ | |
| 14 | Polyfunctional epoxy + novolac-type phenol E | 6 | G | ○ | Δ (DF) | DF Varied |

(5) Discussions

In sample 4 in Experimental Example 1, a resol-type phenolic resin A was used as a thermosetting resin, and the "residual stress after curing" was 10 MPa as shown in Table 1. In sample 11 in Experimental Example 3, the "type of thermosetting resin" was a resol-type phenolic resin B, and the "residual stress after curing" was 8 MPa as shown in Table 3. In samples 4 and 11, satisfactory results were obtained in all of the items of "metal ball", "bondability", and "electrical characteristics".

On the other hand, in sample 12, the "type of thermosetting resin" was a resol-type phenolic resin C, and the "residual stress after curing" was 5 MPa. Accordingly, the sample was rated "Δ (DF)" in the column of "electrical characteristics", and there were relatively large variations in dielectric loss tangent. This may be ascribable to deterioration of conductivity of the conducting layer due to a shortage of a tightening force (shrinkage force) of a resin film as a conducting layer after curing.

Next, in samples 13 and 14, a combination of a polyfunctional epoxy resin and a novolac-type phenolic resin was used, rather than a resol-type phenolic resin, as a thermosetting resin. When comparing sample 13 with sample 14, a combination of a polyfunctional epoxy resin and a novolac-type phenolic resin D was used as a thermosetting resin in sample 13, while a combination of a polyfunctional epoxy resin and a novolac-type phenolic resin E was used as a thermosetting resin in sample 14.

As a result, in sample 13, the "residual stress after curing" was 8 MPa, and satisfactory results were obtained in all of the items of "metal ball", "bondability" and "electrical characteristics". On the other hand, in sample 14, the "residual stress after curing" was 6 MPa, the rate of "Δ (DF)" was given in the column of "electrical characteristics", and there were relatively large variations in dielectric loss tangent. This may be ascribable to deterioration of conductivity of the conducting layer due to a shortage of a tightening force (shrinkage force) of a resin film as a conducting layer after curing as in the case of sample 12.

From the above, it can be thought that when a thermosetting resin in which the "residual stress after curing" can be 8 MPa or more is used, variations in electrical characteristics can be reduced.

EXPERIMENTAL EXAMPLE 4

Experimental Example of Changing Metal Content after Drying (1) Preparation of Thermosetting Conductive Resin Composition Except that the ratio of Sn powder to the total amount of the Sn powder and the Cu powder was fixed at 40% by weight and instead, the total content of the Cu powder and the Sn powder after removal of the organic solvent, i.e. the "metal content after drying", in the thermosetting conductive resin composition was changed as shown in Table 4, the same procedure as in Experimental Example 1 was carried out to obtain an uncured thermosetting conductive resin composition as a sample.

Sample 24 in Experimental Example 4 is identical to sample 4 in Experimental Example 1.

(2) Formation of Conducting Layer

Under the same conditions as in Experimental Example 1, a thermosetting conductive resin composition was added to each of both end surfaces of a laminated body as a component main body for a laminated ceramic capacitor, and heat-treated to obtain a laminated body in which a conducting layer in an external electrode was formed on each of both end surfaces.

(3) Formation of Plating Layer

A laminated ceramic capacitor as a sample was obtained by forming a Ni plating layer and a Sn plating layer on a conducting layer under the same conditions as in Experimental Example 1.

(4) Evaluations

As shown in Table 4, samples were evaluated for the items of "metal ball", "bondability", and "electrical characteristics" as evaluated in Experimental Example 1.

TABLE 4

| Sample number | Metal Content after drying (% by volume) | Metal ball | Bondability | Electrical characteristics | Remarks |
|---|---|---|---|---|---|
| 21 | 40 | G | ○ | ○ | Ni plating characteristic deteriorated |
| 22 | 45 | G | ○ | ○ | |
| 23 | 50 | G | ○ | ○ | |
| 24 | 55 | G | ○ | ○ | |
| 25 | 60 | G | ○ | ○ | |
| 26 | 65 | G | ○ | ○ | |
| 27 | 70 | G | ○ | ○ | Cured film compactness deteriorated |

(5) Discussions

In samples 21, 22, 23, 24, 25, 26 and 27 with the "metal content after drying" being 40% by volume, 45% by volume, 50% by volume, 55% by volume, 60% by volume, 65% by volume and 70% by volume, respectively, satisfactory results were obtained in all of the items of "metal ball", "bondability" and "electrical characteristics" as shown in Table 4.

However, the compactness of a resin film as a conducting layer after curing was evaluated, and the result showed that in sample 27 with the "metal content after drying" being 70% by volume, the compactness of the resin film was deteriorated although there would be no problem in product characteristics.

On the other hand, the Ni plating characteristic was evaluated, and the result showed that in sample 21 with the "metal content after drying" being 40% by volume, the Ni plating characteristic was deteriorated although there would be no problem in product characteristics. This may be due to a shortage of the amount of metal in the conducting layer.

From the above, it can be determined that the "metal content after drying" is preferably 45 to 65% by volume.

EXPERIMENTAL EXAMPLE 5

Experimental Example of Changing D50 Value of Cu Powder (1) Preparation of Thermosetting Conductive Resin Composition Except that the ratio of Sn powder to the total amount of the Sn powder and the Cu powder was fixed at 40% by weight and instead, the "D50 of Cu powder" was changed as shown in Table 5, the same procedure as in Experimental Example 1 was carried out to obtain an uncured thermosetting conductive resin composition as a sample.

Sample 33 in Experimental Example 5 is identical to sample 4 in Experimental Example 1.

(2) Formation of Conducting Layer

Under the same conditions as in Experimental Example 1, a thermosetting conductive resin composition was added to each of both end surfaces of a laminated body as a component main body for a laminated ceramic capacitor, and heat-treated to obtain a laminated body in which a conducting layer in an external electrode was formed on each of both end surfaces.

(3) Formation of Plating Layer

A laminated ceramic capacitor as a sample was obtained by forming a Ni plating layer and a Sn plating layer on a conducting layer under the same conditions as in Experimental Example 1.

(4) Evaluations

As shown in Table 5, samples were evaluated for the items of "metal ball", "bondability", and "electrical characteristics" as evaluated in Experimental Example 1.

TABLE 5

| Sample number | D50 of Cu powder (μm) | Metal ball | Bondability | Electrical characteristics | Remarks |
|---|---|---|---|---|---|
| 31 | 0.3 | G | ○ | ○ | Horn shape |
| 32 | 0.5 | G | ○ | ○ | |
| 33 | 1.0 | G | ○ | ○ | |
| 34 | 2.0 | G | ○ | ○ | |
| 35 | 3.0 | G | ○ | ○ | |
| 36 | 5.0 | G | ○ | ○ | Ni plating characteristic deteriorated |

(5) Discussions

In samples 31, 32, 33, 34, 35 and 36 with the "D50 of Cu powder" being 0.3 μm, 0.5 μm, 1.0 μm, 2.0 μm, 3.0 μm and 5.0 μm, respectively, satisfactory results were obtained in all of the items of "metal ball", "bondability" and "electrical characteristics" as shown in Table 5.

However, in sample 31 with the "D50 of Cu powder" being 0.3 μm, the yield value of the paste of the thermosetting conductive resin composition was high, so that when the thermosetting conductive resin composition was applied to the laminated body, a "horn" shape appeared although there would be no problem in product characteristics.

On the other hand, in sample 36 with the "D50 of Cu powder" being 5.0 μm, the Ni plating characteristic was deteriorated although there would be no problem in product characteristics.

From the above, it can be determined that the "D50 of Cu powder" is preferably in a range of 0.5 to 3.0 μm.

EXPERIMENTAL EXAMPLE 6

Experimental Example of Changing D50 Value of Sn Powder (1) Preparation of Thermosetting Conductive Resin Composition Except that the ratio of Sn powder to the total amount of the Sn powder and the Cu powder was fixed at 40% by weight and instead, the "D50 of Sn powder" was changed as shown in Table 6, the same procedure as in Experimental Example 1 was carried out to obtain an uncured thermosetting conductive resin composition as a sample.

Sample 42 in Experimental Example 6 is identical to sample 4 in Experimental Example 1.

(2) Formation of Conducting Layer

Under the same conditions as in Experimental Example 1, a thermosetting conductive resin composition was added to each of both end surfaces of a laminated body as a component main body for a laminated ceramic capacitor, and heat-treated to obtain a laminated body in which a conducting layer in an external electrode was formed on each of both end surfaces.

(3) Formation of Plating Layer

A laminated ceramic capacitor as a sample was obtained by forming a Ni plating layer and a Sn plating layer on a conducting layer under the same conditions as in Experimental Example 1.

(4) Evaluations

As shown in Table 6, samples were evaluated for the items of "metal ball", "bondability", and "electrical characteristics" as evaluated in Experimental Example 1.

TABLE 6

| Sample number | D50 of Sn powder (μm) | Metal ball | Bondability | Electrical characteristics | Remarks |
|---|---|---|---|---|---|
| 41 | 0.9 | G | ○ | ○ | Horn shape |
| 42 | 1.5 | G | ○ | ○ | |
| 43 | 2.5 | G | ○ | ○ | |
| 44 | 5.0 | G | ○ | ○ | |
| 45 | 7.5 | G | ○ | ○ | Cured film compactness deteriorated |

(5) Discussions

In samples 41, 42, 43, 44 and 45 with the "D50 of Sn powder" being 0.9 μm, 1.5 μm, 2.5 μm, 5.0 μm and 7.5 μm, respectively, satisfactory results were obtained in all of the items of "metal ball", "bondability" and "electrical characteristics" as shown in Table 6.

However, in sample 41 with the "D50 of Sn powder" being 0.9 μm, a "horn" shape appeared when the thermosetting conductive resin composition was applied to the laminated body, although there would be no problem in product characteristics.

On the other hand, in sample 45 with the "D50 of Sn powder" being 7.5 μm, the compactness of a resin film as a conducting layer after curing was deteriorated although there would be no problem in product characteristics.

From the above, it can be determined that the "D50 of Sn powder" is preferably in a range of 1.5 to 5.0 μm.

EXPERIMENTAL EXAMPLE 7

Experimental Example of Changing Other Conditions (1) Preparation of Thermosetting Conductive Resin Composition Except that the ratio of Sn powder to the total amount of the Sn powder and the Cu powder was fixed at 40% by weight and instead, in sample 51, the "shape of Cu powder" was a flat shape as shown in Table 7, the same procedure as in Experimental Example 1 was carried out to obtain an uncured thermosetting conductive resin composition as a sample.

The thermosetting conductive resin compositions of samples 52 and 53 in Experimental Example 7 are each identical to the thermosetting conductive resin composition prepared in Experimental Example 1.

(2) Formation of Conducting Layer

Basically under the same conditions as in Experimental Example 1, a thermosetting conductive resin composition was added to each of both end surfaces of a laminated body as a component main body for a laminated ceramic capacitor, and heat-treated to obtain a laminated body in which a conducting layer in an external electrode was formed on each of both end surfaces. Different points are as follows.

In sample 52, a laminated body having a plane dimension of 1.6 mm×0.8 mm was used as a laminated body as described as "1608" in the column of "laminated body dimension" in Table 7. In other samples 51 and 53, a laminated body having a plane dimension of 1.0 mm×0.5 mm as in the case of Experimental Example 1 was used as a laminated body as described as "1005" in the column of "laminated body dimension" in Table 7.

In sample 53, the heat treatment top temperature for curing the thermosetting conductive resin composition was 400° C. as shown in the column of "curing top temperature" in Table 7. In other samples 51 and 52, as shown in the column of "curing top temperature" in Table 7, the heat treatment top temperature for curing the thermosetting conductive resin composition was 450° C. as in the case of Experimental Example 1.

(3) Formation of Plating Layer

A laminated ceramic capacitor as a sample was obtained by forming a Ni plating layer and a Sn plating layer on a conducting layer under the same conditions as in Experimental Example 1.

(4) Evaluations

As shown in Table 7, samples were evaluated for the items of "metal ball", "bondability", and "electrical characteristics" as evaluated in Experimental Example 1.

For sample 53, the "residual stress after curing" and "ratio of Ni in CuSnNi alloy phase" were also evaluated.

(5) Discussions

In each of samples 51 to 53, satisfactory results were obtained in all of the items of "metal ball", "bondability" and "electrical characteristics" as shown in Table 7.

Thus, it has become apparent that even when the Cu powder is changed to a flat powder, or the dimension of the laminated body is changed, or the curing top temperature is changed from 450° C. to 400° C., desired characteristics can be exhibited.

Particularly in regard to sample 53, even when the curing top temperature was changed from 450° C. to 400° C., the "residual stress after curing" was 9 MPa, i.e. a value consistent with a value of 8 MPa or more as considered preferable in Experimental Example 3, and the "ratio of Ni in CuSnNi alloy phase" was 8 atm %, i.e. a value falling within a range of 5 to 42 atm % as considered preferable in Experimental Example 1.

EXPERIMENTAL EXAMPLE 8

Comparative Experimental Example for Ratio of Sn (1) Preparation of Thermosetting Conductive Resin Composition Except that the ratio of Sn powder to the total amount of the Sn powder and the Cu powder was changed as shown in the column of "ratio of Sn" in Table 8 in accordance with the ratio described in claim 3 of Patent Document 2, the same procedure as in Experimental Example 1 was carried out to obtain an uncured thermosetting conductive resin composition as a sample.

(2) Formation of Conducting Layer

Under the same conditions as in Experimental Example 1 except that for samples 62 and 64, the heat treatment top temperature for curing the thermosetting conductive resin composition was 550° C. as shown in the column of "curing top temperature" in Table 8, a thermosetting conductive resin composition was added to each of both end surfaces of a laminated body as a component main body for a laminated ceramic capacitor, and heat-treated to obtain a laminated body in which a conducting layer in an external electrode was formed on each of both end surfaces.

(3) Formation of Plating Layer

A laminated ceramic capacitor as a sample was obtained by forming a Ni plating layer and a Sn plating layer on a conducting layer under the same conditions as in Experimental Example 1.

(4) Evaluations

As shown in Table 8, samples were evaluated for the items of "residual stress after curing", "metal ball", "bondability", and "electrical characteristics" as evaluated in Experimental Example 1.

TABLE 7

| Sample number | Shape of Cu powder | Laminated body dimension | Curing top temperature (° C.) | Residual Stress after Curing (MPa) | Metal ball | Bondability | Ratio of Ni in mutual diffusion layer (atom %) | Electrical characteristics |
|---|---|---|---|---|---|---|---|---|
| 51 | Flat | 1005 | 450 | — | G | ◯ | — | ◯ |
| 52 | Spherical | 1608 | 450 | — | G | ◯ | — | ◯ |
| 53 | Spherical | 1005 | 400 | 9 | G | ◯ | 8 | ◯ |

TABLE 8

| Sample number | Ratio of Sn (% by weight) | Curing top temperature (° C.) | Residual Stress after Curing (MPa) | Metal ball | Bondability | Electrical characteristics |
|---|---|---|---|---|---|---|
| 61 | 5 | 450 | 10 | G | x | x(cap/DF) |
| 62 | 5 | 550 | 10 | G | x | x(cap/DF) |
| 63 | 20 | 450 | 10 | G | x | x(cap/DF) |
| 64 | 20 | 550 | 11 | G | x | x(cap/DF) |

(5) Discussions

In samples 61 to 64, the "residual stress after curing" was 8 MPa or more, and the rate of "G" was given for the "metal ball" as shown in Table 8.

However, in samples 61 to 64 with the "ratio of Sn" being as low as 5% by weight and 20% by weight, not only samples 61 and 63 having a relatively low "curing top temperature" of 450° C., but also samples 62 and 64 having a relatively high "curing top temperature" of 550° C. were rated "x" for "bondability" and rated "x (cap/DF)" for "electrical characteristics". The reason for this may be a shortage of the absolute amount of Sn.

EXPERIMENTAL EXAMPLE 9

Comparative Experimental Example of Using Ag Powder in Place of Cu Powder (1) Preparation of Thermosetting Conductive Resin Composition Except that an Ag powder was used in place of the Cu powder, and the ratio of Sn powder to the total amount of the Ag powder and the Sn powder was fixed to 20% by weight, an upper limit of a ratio of a metal on the low-melting-point side as set forth in claim 3 of Patent Document 2, the same procedure as in Experimental Example 1 was carried out to obtain an uncured thermosetting conductive resin composition as a sample.

(2) Formation of Conducting Layer

Under the same conditions as in Experimental Example 1 except that the heat treatment top temperature for curing the thermosetting conductive resin composition was applied as shown in the column of "curing top temperature" in Table 9, a thermosetting conductive resin composition was added to each of both end surfaces of a laminated body as a component main body for a laminated ceramic capacitor, and heat-treated to obtain a laminated body in which a conducting layer in an external electrode was formed on each of both end surfaces.

(3) Formation of Plating Layer

A laminated ceramic capacitor as a sample was obtained by forming a Ni plating layer and a Sn plating layer on a conducting layer under the same conditions as in Experimental Example 1.

(4) Evaluations

As shown in Table 9, samples were evaluated for the items of "residual stress after curing", "metal ball", "bondability", and "electrical characteristics" as evaluated in Experimental Example 1.

TABLE 9

| Sample number | Curing top temperature (° C.) | Residual Stress after Curing (MPa) | Metal ball | Bondability | Electrical characteristics |
|---|---|---|---|---|---|
| 71 | 450 | 10 | G | X | X (cap/DF) |
| 72 | 550 | 11 | NG | ○ | ○ |

(5) Discussions

In samples 71 and 72, the "residual stress after curing" was 8 MPa or more as shown in Table 9.

However, sample 71 had a "curing top temperature" of 450° C., and was therefore rated "x" for "bondability", and resultantly rated "x (cap/DF)" for "electrical characteristics".

On the other hand, sample 72 having a "curing top temperature" of 550° C. was rated "o" for "bondability", and rated "o" for "electrical characteristics". The reason for this may be that the "curing top temperature" (550° C.) was higher than the melting point (481° C.) of generated $Ag_3Sn$, so that a liquid phase was formed. However, sample 72 was rated "NG" for "metal ball" due to eruption of the above-mentioned liquid phase to the surface of the conducting layer, leading to a poor outer appearance, which may raise a problem in practical use.

DESCRIPTION OF REFERENCE SYMBOLS

1 Laminated ceramic capacitor
2 Ceramic layer
3,4 Internal electrode
5 Laminated body
8,9 External electrode
10 Conducting layer
11 Ni plating layer
12 Sn plating layer
21 Thermosetting conductive resin composition
22 Cu powder
23 Sn powder
24 Thermosetting resin
25 Metal particles

The invention claimed is:

1. A laminated ceramic electronic component comprising:
   a laminated body having a ceramic layer and an internal electrode containing Ni;
   an external electrode on an outer surface of the laminated body and electrically connected to the internal electrode, the external electrode comprising a conducting layer that is in contact with the internal electrode, and the conducting layer having metal particles containing a $Cu_3Sn$ alloy, and a thermosetting resin; and
   a CuSnNi alloy phase interposed between and bonding the internal electrode and the conducting layer to each other.

2. The laminated ceramic electronic component according to claim 1, wherein a solid solution amount of Ni in the CuSnNi alloy phase is 5 atm % to 42 atm %.

3. The laminated ceramic electronic component according to claim 1, wherein the metal particles contain Sn in a weight ratio of 36.5% to 47.8% to a total amount of Sn and Cu.

4. The laminated ceramic electronic component according to claim 1, wherein a ratio of the $Cu_3Sn$ alloy to a total amount of Sn and Cu contained in the metal particles is 25% by weight or more.

5. The laminated ceramic electronic component according to claim 1, wherein the conducting layer is a thermally cured thermosetting conductive resin composition.

6. The laminated ceramic electronic component according to claim 5, wherein the thermally cured thermosetting conductive resin composition contains a Cu powder, a Sn powder, a thermosetting resin and an organic solvent before curing.

7. The laminated ceramic electronic component according to claim 6, wherein the thermally cured thermosetting conductive resin composition has a Sn powder content of 36.5% by weight to 47.8% by weight based on a total amount of the Cu powder and the Sn powder before curing.

8. The laminated ceramic electronic component according to claim 6, wherein a total content of the Cu powder and the Sn powder in the thermally cured thermosetting conductive resin composition is 45% by volume to 65% by volume after removal of the organic solvent.

9. The laminated ceramic electronic component according to claim 6, wherein a D50 value of the Cu powder is 0.5 µm to 3.0 µm and a D50 value of the Sn powder is 1.5 µm to 5.0 µm before curing of the thermally cured thermosetting conductive resin composition.

10. The laminated ceramic electronic component according to claim 5, wherein a residual stress of the thermally cured thermosetting conductive resin composition is 8 MPa or more.

* * * * *